United States Patent [19]

Graham

[11] Patent Number: 5,469,301
[45] Date of Patent: Nov. 21, 1995

[54] PRISM POD

[76] Inventor: Edgar E. Graham, 6919 Bluebird La., Alvin, Tex. 77511

[21] Appl. No.: 242,166
[22] Filed: May 13, 1994
[51] Int. Cl.$^6$ .................. G02B 5/04; G01C 3/08
[52] U.S. Cl. ........................ 359/831; 33/293
[58] Field of Search .................. 359/831, 833, 359/834, 529; 356/7, 8, 14, 16, 17, 18, 19; 364/550, 556, 560; 33/293, 295, 644, 666

[56] References Cited

U.S. PATENT DOCUMENTS 4,311,382 1/1982 Buckley et al. .................. 33/293
4,470,664 9/1984 Shirasawa ...................... 33/293
4,875,760 10/1989 Youngren et al. .................. 33/293

Primary Examiner—Paul M. Dzierzynski
Assistant Examiner—Mohammad Y. Sikder
Attorney, Agent, or Firm—Workman, Nydegger & Seeley

[57] ABSTRACT

A magnetic prism pod device for electronic distance measurement on pipe and flat surfaces is disclosed that has the capability of self-attaching to pipe and steel surfaces. The prism pod device has leveling capabilities for taking measurements to the center line of a pipe from all directions. The device also has the ability to be replaced exactly over a previously used spot once removed from that spot.

1 Claim, 5 Drawing Sheets

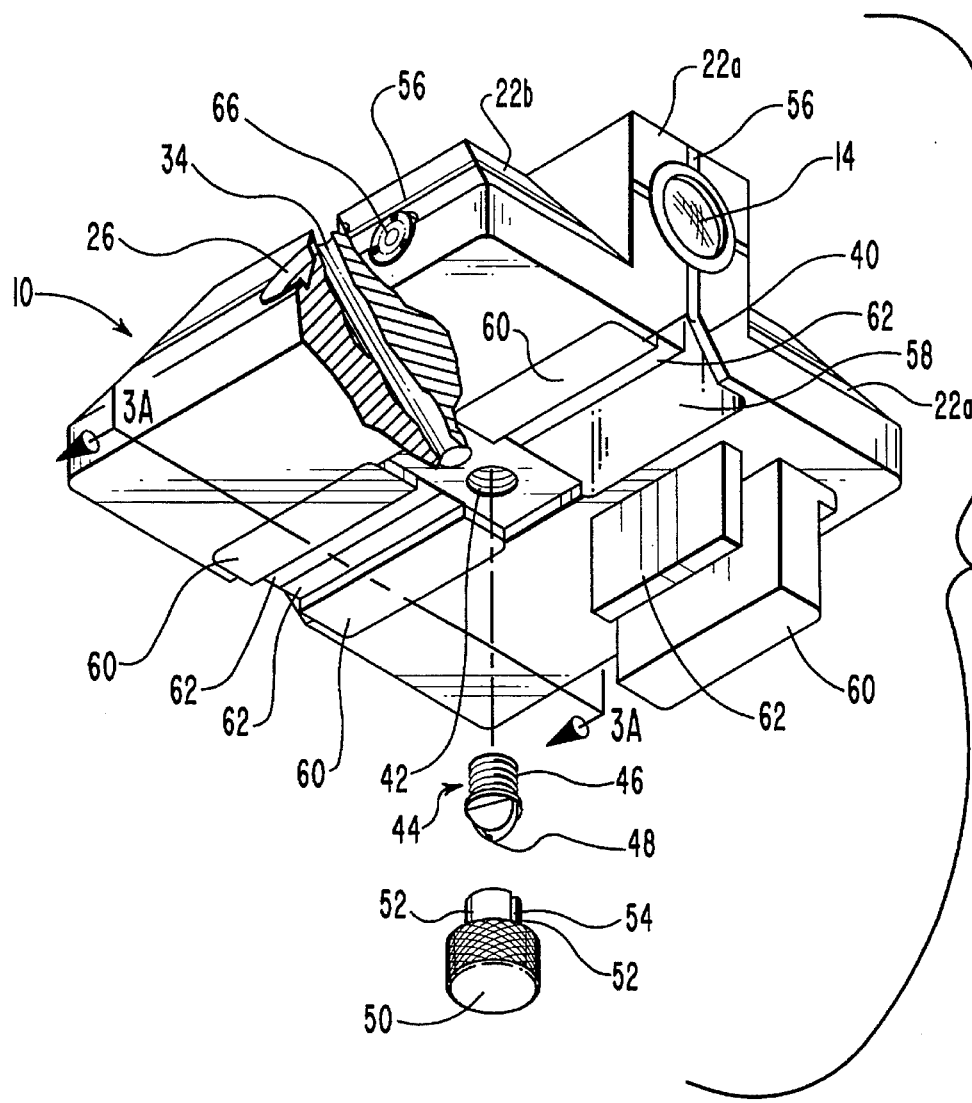
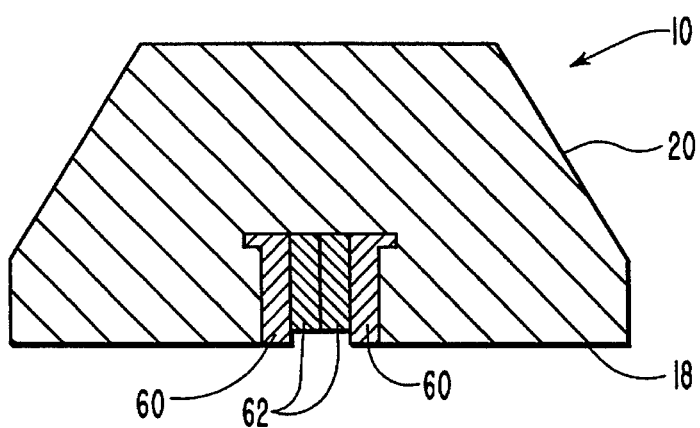

PRISM POD

BACKGROUND

1. Field of the Invention

This invention relates to prism devices used in conjunction with electronic distance measuring, and more particularly to a prism pod device which self-attaches for precise measurements to pipe and level surfaces, and which has the capability of exact repeatability of measurements when the device has been moved and must be placed back into its previous location.

2. Background Art

Various methods have been used in surveying to measure precise distances, elevation differences, directions, and angles. One of the most basic methods is with the use of a transit, which is merely a scope commonly used with a range pole that is marked with graduations. The scope is aimed at the pole and the graduations on the pole are measured to determine the distance been the pole and the transit.

A more accurate form of measurement is with the theodolite. The theodolite has more accurate graduations and reading mechanisms for taking more precise measurements. One of the most accurate of the prior art measuring methods is electronic distance measurement (EDM), particularly electronic distance measurement utilizing a laser or other light beam. These beams are conventionally shot to prisms located on the top of a range pole or prism pole as it is also known. The range pole is positioned using leveling bubbles. Due to the length of the pole and the distance of the prism at the end of the pole from the actual point being shot, there is still an inherent lack of accuracy in this method, since it is virtually impossible to hold the pole constantly level.

When measuring distances between pipes and layouts of piping, as with oil fields, for instance, high precision is required. Generally, distances must be calculated to within 1/16 of an inch. This becomes difficult when measuring pipe over long distances, particularly when the range pole must be placed on the pipe. In these instances, not only is there an inherent inaccuracy, but locating the poles on the pipe is itself difficult and imprecise.

Further, using a range pole requires two operators, one to run the range pole and one to run the theodolite or electronic distance measurement equipment.

Also, in measurements of flat areas and of pipe, there is a great deal of difficulty in taking repeat measurements to a previously measured spot. This occurs when a calculation has been taken to a first location, the range pole has been removed from the point to do measurements to other locations, after which measurements must be taken again to the first location. The difficulty lies in accurately placing the range pole back to the first location. A further reason for the difficulty is that the measuring equipment is shooting to a point on the range pole in the air rather than on the pipe or on the ground.

BRIEF SUMMARY AND OBJECTS OF THE INVENTION

The present invention seeks to resolve the above and other problems which have been experienced in the art. It is thus a principal object of the invention to provide a prism pod device that gives accurate, dependable EDM measurements for high-tolerance work with just one setup of the device.

It is another object of the present invention to provide a prism pod device that can be easily attached to pipe or located on flat surfaces with a high degree of repeatability for subsequent measurement, and which has only one associated offset for the variety of different angles and surfaces on the device which can be used in such measurements.

It is further an object of the present invention to provide a prism pod device that is compatible with existing surveying equipment, is versatile in its applications, and works well when used with a range pole.

It is further an object of the invention to provide a prism pod device that is quick and easy to use and that conveniently self-attaches to a surface, so as to eliminate the need for a second operator to hold the device.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the forgoing objects, and in accordance with the invention as embodied and broadly described herein, the present invention comprises a prism pod device for use in electronic distance measurement (EDM) to replace a conventional prism. The prism pod device is magnetically self-attaching and may be used efficiently on any level surface, but is specifically designed for use in taking measurements to metallic pipe. The device is designed to be precisely locatable and relocatable and to be used without a holding rod. It may also be used with a holding rod in the conventional method.

The prism pod device comprises a housing of multiple faces with prisms located separately on faces of the device. The prisms are aligned such that they each point and focus upon the vertical axis of the housing such that measurements taken from all angles to the prism pod are taken to the center line of any pipe the pod is attached to. Measurements may also be taken to the surface of an object (such as a pipe or a level area) being measured, depending on the setup of the inventive prism pod device. The prism pod device also comprises a magnet and a V-shaped notch on its bottom surface for self-attaching to pipe. It further comprises an extendable center point for marking an indentation by impact. The marked indentation can then be used to relocate the prism pod device back to the same exact location. Also included in the inventive prism pod device are level vials for centering the device, a view port for aligning the center point back into a previously made indentation for exact repeatability of measurements, and threaded bores for receiving holding rods and for receiving a peep sight.

BRIEF DESCRIPTION OF THE DRAWINGS

In order to more fully understand the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention and the presently understood best mode for making and using the same will be described with additional specificity and detail through the use of the accompanying drawings in which:

FIG. 3 is an exploded perspective cutaway view from the bottom of the presently preferred embodiment of the prism pod device of the present invention illustrating the center point, the center point adjusting tool, a magnetic pole, and a magnet.

FIG. 3A is a sectional view taken along the 3A—3A line of FIG. 3 more particularly illustrating the placement of the magnets and magnetic poles.

DETAILED DESCRIPTION OF THE PREFERRED EMBODIMENTS

The present invention is broadly described as a prism pod device for use in surveying field measurements and more particularly as a prism pod device for taking measurements with or without a range pole, having the capability of magnetically self-attaching to a metallic surface, such as a pipe, for taking precise measurements on the surface, and having the capability of exact repeatability on pipe or on level surfaces.

Figure 1:
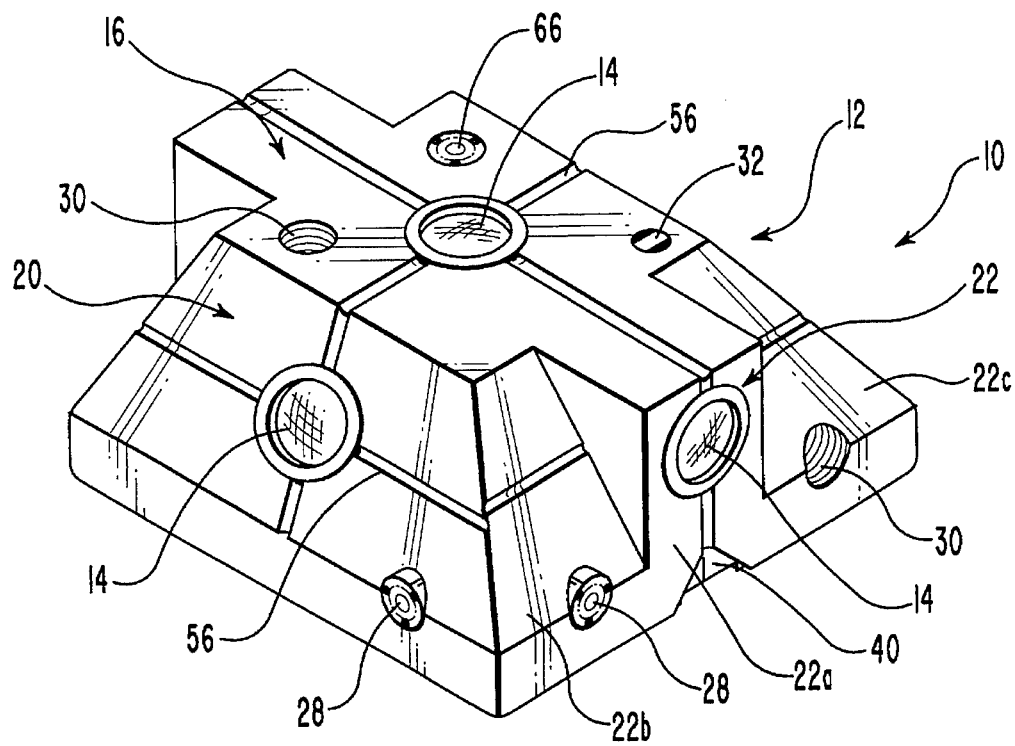
FIG. 1 is a perspective view from the top of the presently preferred embodiment of the prism pod device of the present invention.
Figure 2:
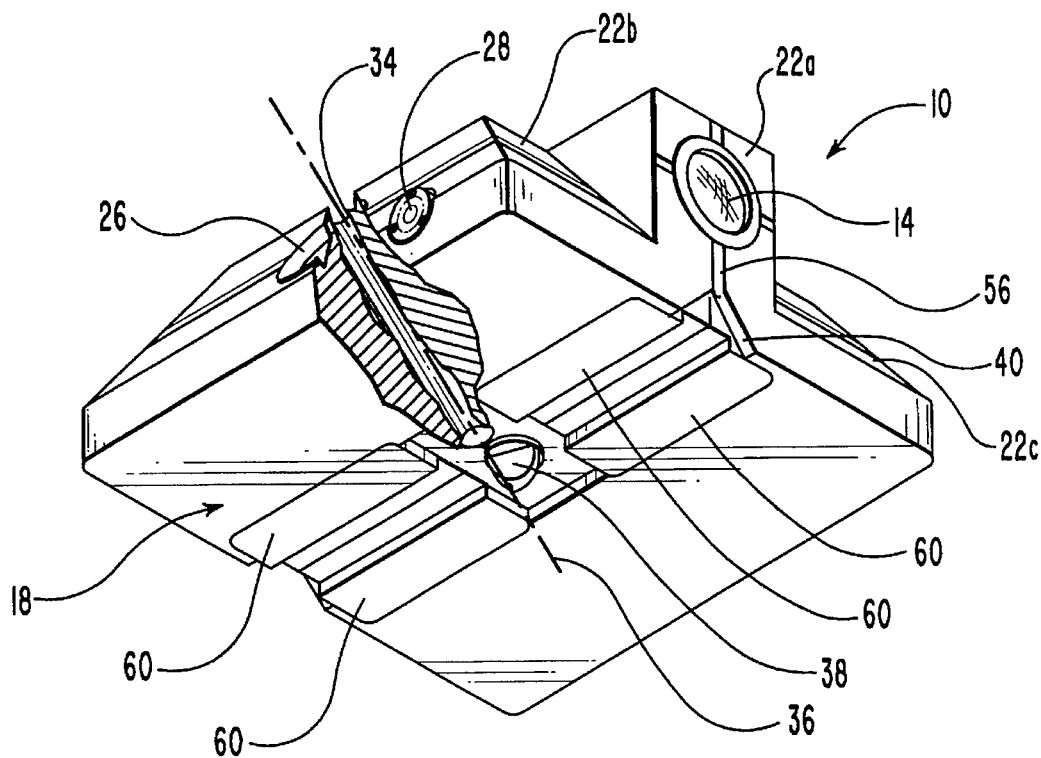
FIG. 2 is a perspective cutaway view from the bottom of the presently preferred embodiment of the prism pod device of the present invention more particularly illustrating the center view port and the V-shaped notch.

In the presently preferred embodiment of the present invention as shown in FIG. 1, the prism pod device is generally indicated at 10. As presently contemplated, the prism pod device comprises a housing 12 having six faces. As presently contemplated, the housing is milled from 6061 aluminum to minimize weight. However, any durable and commercially feasible material might be used. A top face 16 and a bottom face 18, which are shown in FIG. 2, are parallel to each other. Two angular side faces 20, which are located on opposite sides of the device, have an inward slope toward top face 16 at a 30 degree angle. The remaining two sides, designated as faceted side faces 22, also located on opposite sides of the device, are each broken into three surfaces. A middle surface 22a of each of perpendicular side faces 22 is perpendicular to top face 16 and bottom surface 18 while the two adjoining outer surfaces 22b, 22d of each of perpendicular side faces 22 slope in toward top face 16 also at a 30 degree angle.

Located on housing 12 of prism pod device 10 of the presently preferred embodiment of the present invention are five prisms 14. Prisms 14 are precision ground multi-faceted glass, contained in prism canisters 24, shown in FIG. 5, which are screwed into threaded prism mounting bores 26 in the housing, shown in FIGS. 2 and 3. Prisms 14 are of a type commonly used for electronic distance measuring available from Seco Manufacturing of Redding, Calif. Seco Model Number 6010, which is a one inch (25 mm) mini prism encased in an aluminum base, is used in the preferred embodiment of the present invention. As presently contemplated, prism pod device 10 includes five prisms 14. One prism 14 is located on top face 16, and one prism 14 is located on each of angular side faces 20 as well as each middle surface 22a of faceted side faces 22. Also located in housing 12 of prism pod 10 of the present invention as presently contemplated are three level vials 28. One vial 28 is provided in top face 16, a second vial is located in one of the angular side faces 20, and a third level vial is located in one of the faceted side faces 22. Level vials 28 contain a bubble for leveling prism pod device 10 in relation to an object on which prism pod device 10 is attached and are of a type known in the art and commercially available. Also located in housing 12 of prism pod device 10 are three threaded range pole mounting holes 30, one in top face 16, one located in an angular side face 20, and a third located in a faceted side face 22. Range pole mounting holes 30 are preferably of a size and thread type that fits conventional measuring rods.

As shown in FIG. 2, also located on top face 16 of housing 12 is a view port 32. As shown in FIG. 2, view port 32 has a bore hole 34 with an axis 36 running from top face 16 down to a geometric central point 38 of bottom face 18 of housing 12 and contains a lens that provides a 160° magnified viewing angle. View port 32 magnifies and allows the user to view central point 38 of bottom face 18 of housing 12. View port 32 is for use in centering housing 12 onto a previously used measuring point as will be discussed below.

Figure 5:
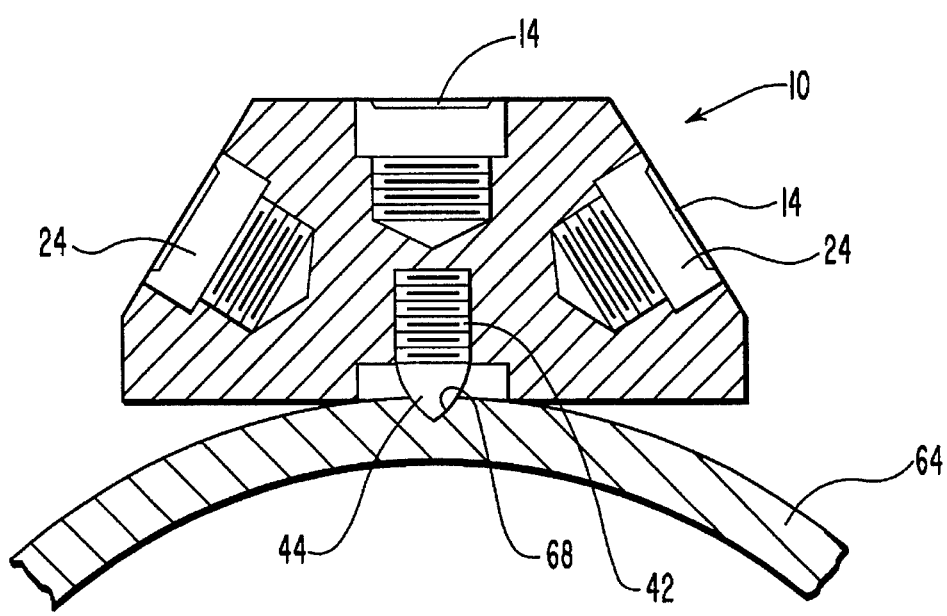
FIG. 5 is a sectional view taken along the 5—5 line of FIG. 4 particularly illustrating the prisms, the prism canisters, the center point, and the indentation made by the center point.

In bottom face 18 of housing 12 is a V-shaped notch 40. Notch 40 traverses the horizontal center line of housing 12 running from one faceted side face 22 to the other faceted side face 22. As depicted in FIG. 3 and 5, central point 38 of bottom face 18 of housing 12 coincides with a threaded center point bore 42 into which may be threaded a center point 44. Center point 44, as illustrated in FIG. 3, has threads on one end and comes to a point 48 at the other end with two flat sides merging into point 48. A center point adjustment tool 50 having two fingers 52 with a slot 54 between fingers 52 for receiving the flat sides near point 48 of center point 44 is used to thread center point 44 into center point bore 42. Center point 44 is preferably of the same diameter as range pole mounting hole 30, so center point 44 may be stored in one of the range pole mounting holes 30 when not in use. Other center points, not depicted, with pointed tips of different lengths than that of the depicted center point 44 may also be provided for use with level objects and objects in which deep or shallow indentations must be made. The depicted center point 44 with point 48 is suitable for use with metallic pipe.

Each of the exterior faces, top face 16, the two angular side faces 20, along with the faceted side faces 22, are provided with cross hair lines 56. Cross-hair lines 56 run vertically and horizontally through each of the faces and intersect at the center of prisms 14. Cross-hair lines 56 are preferably black so as to create a contrast between housing 12 that may be clearly seen from distances.

As illustrated in FIG. 2, 3, and 3A, V-shaped notch 40 on bottom face 18 of housing 12 has recesses 58 for receiving magnet poles 60. Magnet poles 60 are assembled onto each side of V-shaped notch 40 and contain and insulate magnet 62 between them. Magnet 62, preferably a ceramic magnet, is placed in V-shaped notch 40 between magnet poles 62 and secured in place. In the presently contemplated embodiment, magnetic poles 60 and magnets 62 are sourced from Bunting Company of Newton, Kans., as assembly number BM-3966.

FIG. 3 illustrates center point 44 that is to be threaded into center point bore 42. FIG. 3 also illustrates center point adjustment tool 50, which is used for inserting center point 44. It further illustrates magnet 62 and one of the magnet poles 60 as well as recess 58 for receiving magnet pole 60. FIG. 3 also illustrates the prism mounting bore 26 which is threaded to receive prism 14 contained in prism canister 24.

FIG. 3a illustrates angular side faces 20, bottom face 18, magnet poles 60, and magnets 62.

Figure 4:
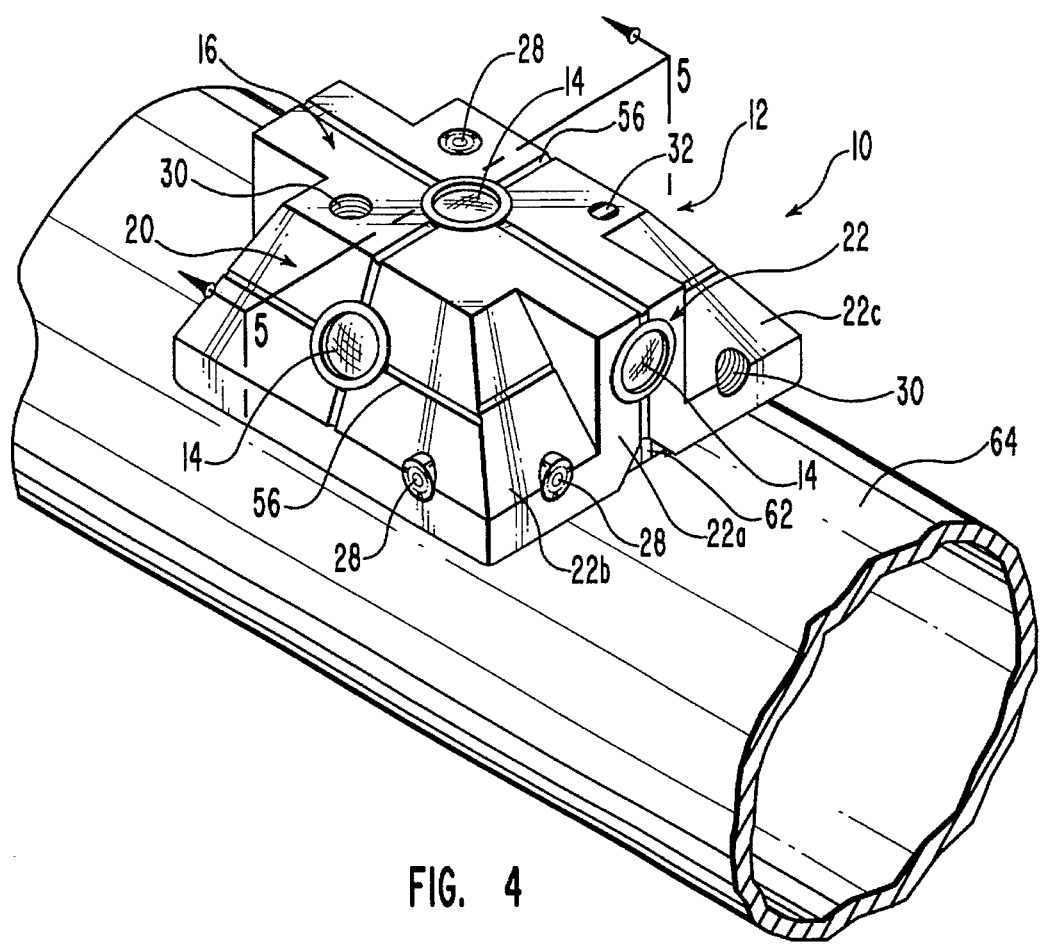
FIG. 4 is a perspective view of the presently preferred embodiment of the prism pod device of the present invention being used on a section of pipe and illustrates proper alignment of the prism pod device on a horizontally running pipe.

FIG. 4 shows prism pod device 10 of the presently preferred embodiment of the present invention being used on a horizontally running pipe 64. V-shaped notch 40 provides a hollowed area for receiving the curvature of pipe 64. The purpose of V-shaped notch 40 is to align prism pod device 10 squarely on pipe 64 so that when prisms 14 reflect light beams to central point 38 of housing 12, central point 38 accurately corresponds to the center line of pipe 64.

Magnets 62 of the presently preferred embodiment of the present invention have a 100 lb. pulling strength. The purpose of magnets 26 is to attach prism pod device 10 firmly to pipe 64 when brought to close proximity with pipe 64, pulling V-shaped notch 40 onto pipe 64 into alignment with the center line of pipe 64. Magnets 12 allow the prism pod device 10 to remain in place without human assistance. This frees up the operator and makes it possible for a single operator to take distance and angle measurements with EDM equipment.

Level vials 28 are used for leveling the prism pod 10 along horizontally level planes. When this is accomplished, prisms 14 will be pointing down to the center line of pipe 64. Once the prism pod is thus centered on pipe 64, center point 44 may be extended, or inserted if it has not already been inserted, with the use of center point adjusting tool 50. Center point 44 is then extended out slightly beyond the surface of pipe 64 such that when the prism pod device 10 is pressed or impacted firmly onto pipe 64, center point 44 pushes into the surface of pipe 64, making an indentation 68 in the surface of pipe 64 as shown in FIG. 5. With the indentation mark 68 on pipe 64, the prism pod may be removed from pipe 64 and later reattached to pipe 64 in the same position, thus providing for repeatability of measurements from the same location.

To reattach to the same position, view port 32 is used to sight in center point 44 and guide it to the previously made indentation 68. The operator looks into view port 32 down to central point 38 on bottom face 18 of housing 12 with the 160 degree magnified view of center point 44 and its surrounding locale. By so doing, the operator may guide center point 44 back into indentation 68. In this manner, the prism pod device 10 will be relocated into the same position it was originally in, allowing for 100% repeatability of all dimensions and measurements previously taken from the position.

Once the prism pod is located in the selected spot on pipe 64, the EDM equipment may then shoot a laser beam or other light beam form at the desired prism 14. Prism 14 will catch the beam and reflect it to central point 38, then back to the EDM equipment so as to standardize measurements regardless of the angle at which the beam contacts the face of prism 14.

If a prism 14 on an angular side face 20 of the prism pod is shot to, the beam will be directed at central point 38 of pipe 64 and back to the EDM equipment. Offset deviations are easily accounting for when using the prism pod device 10. As shown in FIG. 5, prisms 14 on angular side face 20 are directed toward central point 38 at bottom face 18 of the prism pod device 10. Central point 38, when correctly aligned, corresponds to the center line of pipe 64. This gives accurate readings to the center line when taken from the side of a pipe. Contrarily, if prism 14 of a perpendicular side face 22 is selected, the light beam will be beamed only to the vertical axis of prism pod device 10. Prisms 14 in faceted side faces 22 are parallel with bottom surface 18 and are directed at the vertical axis of housing 12. Thus, accurate readings to the center line of pipe 64 are given when a reading is taken head-on from pipe 64.

Figure 6:
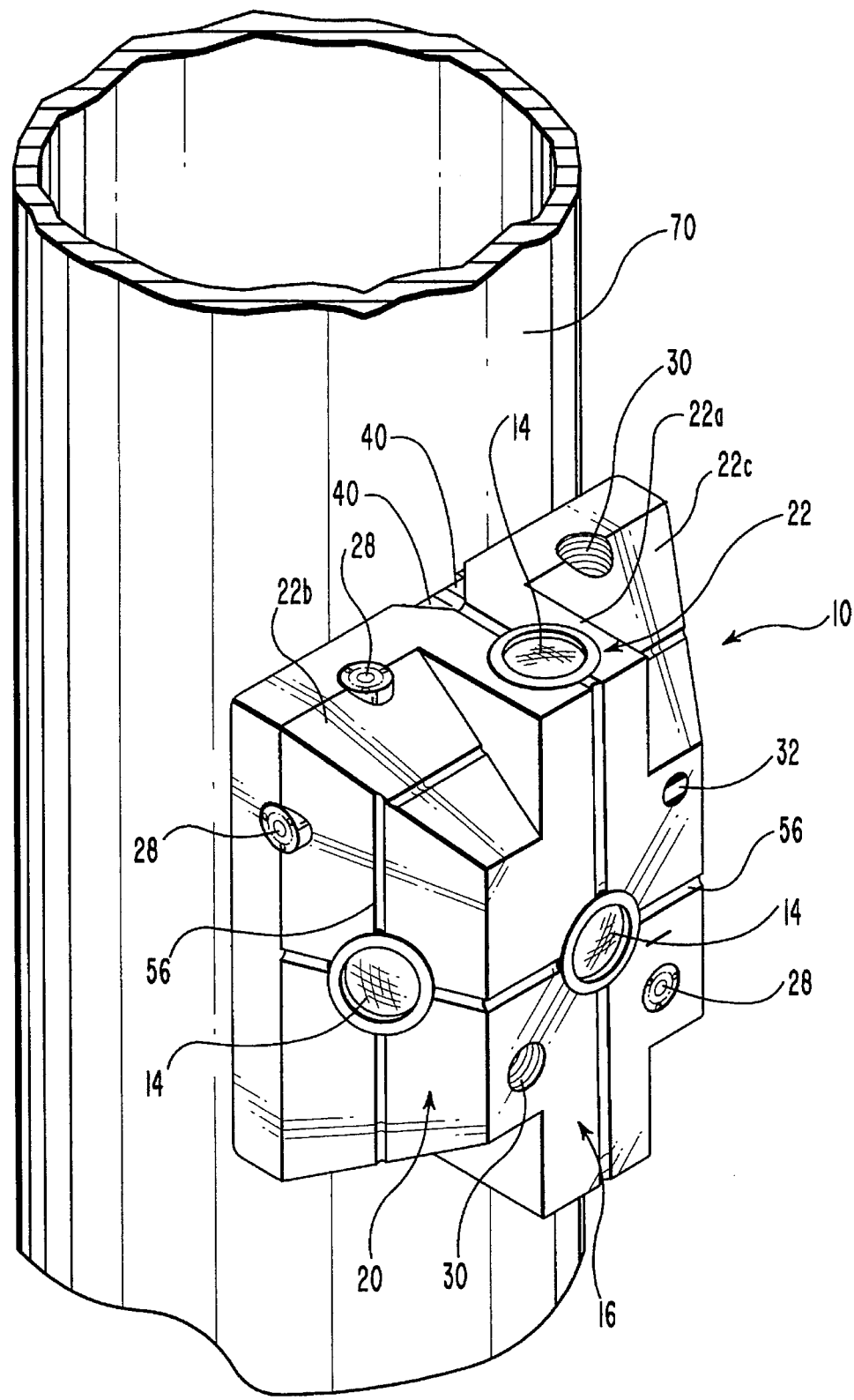
FIG. 6 is a perspective view of the presently preferred embodiment of the prism pod device of the present invention being used on a section of pipe and illustrates proper alignment on a pipe running vertically.

If prism pod device 10 is used on a vertically running pipe 70 as shown in FIG. 6, the beam may be transmitted to prism 14 on top face 16 of housing 12. The beam will then be directed to central point 38 of bottom face 18 of housing 12 which is the point that prism 14 on top face 16 is directed to. This corresponds to the outer edge of pipe 70 at its center line.

It is important to the invention that measurements be taken to pipe 70 at its center line on the outer edge of pipe 70 as pipe measurements are typically taken to the center line by those in the industry. Measurements taken to pipe 70 in the fashion recited above have been found to be accurate to within $1/16$ of an inch.

On vertically extending pipe 70, since prism 14 on top face 16 will be used and the beam will be directed to the center line of pipe 70, level vials 28 need not be used to find the center line of pipe 70. Rather, once the beam is lined up in cross-hair lines 56 to prism 14, the beam will be automatically transmitted to the center line of pipe 70, which is also the central point 38 of bottom face 18 of housing 12.

The procedure for shooting to level surfaces is simpler than shooting to a pipe line. The point to be measured to is selected, and center point 44 is extended to project into the surface. A longer center point is preferably used, since the center point must extend out further for level surfaces than for pipe and since the indentations are typically deeper. The prism pod is then aligned with the angular side face 20 facing the EDM equipment. The prism pod with center point 44 extended is pressed into the ground to create an indentation for later repetitions of the EDM measurements. The EDM equipment is aimed at cross-hairs 56 and the laser beam is shot to prism 14. An accompanying computer will then calculate the distance or angle to be measured, accounting for a previously entered offset value.

If the prism pod device 10 would be obscured resting on unlevel ground, it may also be attached to the top of a range pole or prism pole. The measurement is then taken to the prism pod device 10 in the same way as to a conventional prism.

Used in its intended manner, the prism pod device 10 outperforms standard prisms in setup time and accuracy. Further, since it is self-attaching, it is possible for one operator to do the job rather than two as required by conventional methods.

Prisms 14 redirect the light beams from EDM equipment as is generally known in the art, such that the equipment may calculate the angle and length of the beam between the EDM equipment and prism 14. In the presently contemplated embodiment, the EDM equipment comprises a total work station. The total work station incorporates a theodolite, a laser emitting gun, as well as a computer to calculate angles, distances, and offsets.

FIG. 5 is a sectional view showing inserted prisms 14 in prism canisters 24 and showing the 30° angle of angular side face 20, further illustrating that prisms 14 of angular side faces 20 are directed to the center line of pipe 64, which is also central point 38 of bottom face 18 of housing 12. FIG. 5 further illustrates center point 44 and center point indentation mark 68 in pipe 64.

A standard offset must be entered into the EDM equipment to account for the distance between prisms 14, and the vertical axis or the bottom center point of the prism pod device 10. However, since the distances between each of the prisms 14 and the points they are directed to are standardized, that offset will be the same for each of prisms 14. Consequently, only one offset need be entered and it can be used for all measurements to each of the prisms 14. This offset is calculated by using a known distance, shooting the EDM equipment at prism pod device 10 over the known distance, then calculating the difference between the known distance and the reading distance from the EDM, and entering that value into the EDM equipment as the offset.

Figure 7:
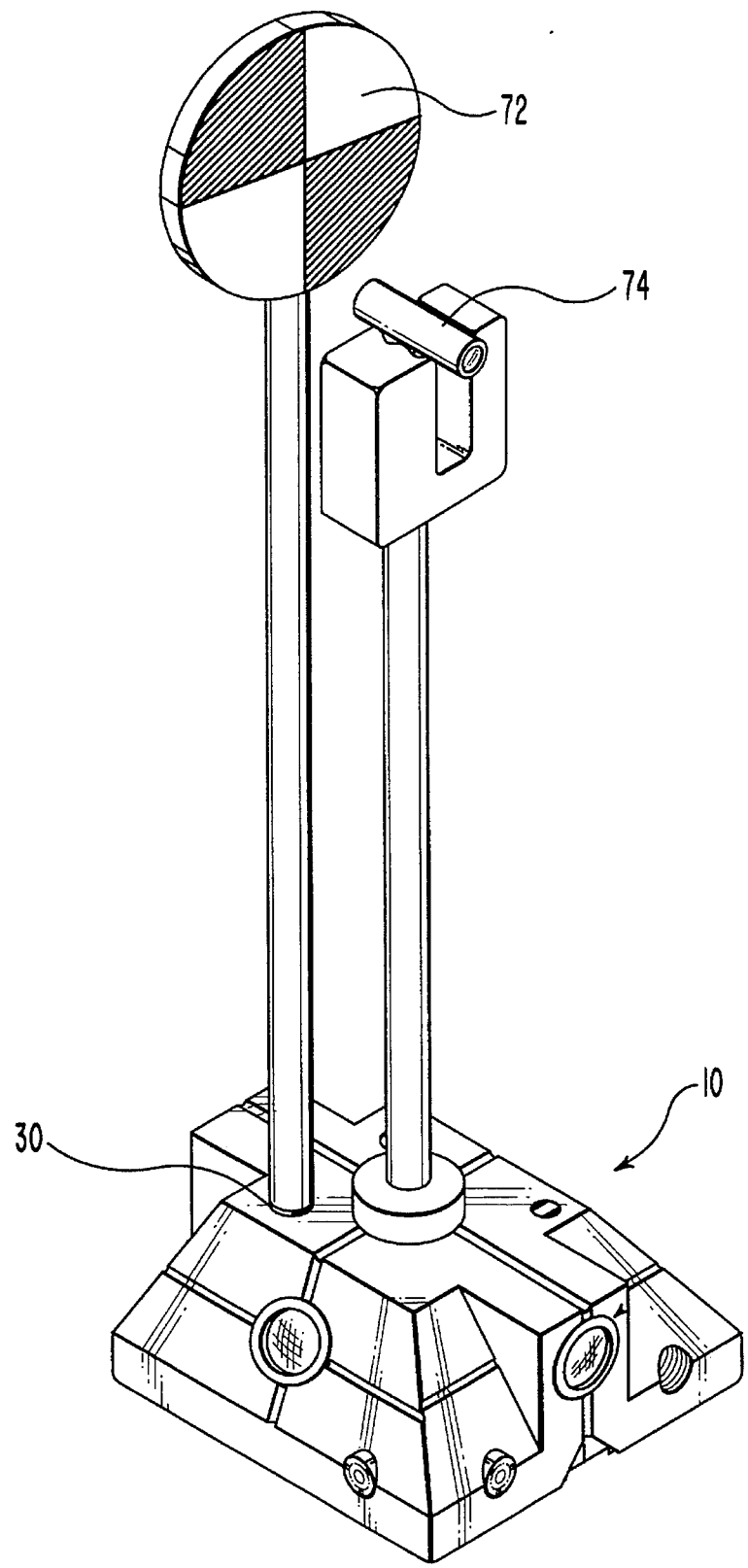
FIG. 7 is a perspective view of the presently preferred embodiment of the prism pod device of the present invention illustrating the capability for attaching to a range pole and further illustrating the optional peep sight attachment to the prism pod device.

FIG. 7 illustrates a range pole 72 inserted into one of the range pole mounting holes 30 of prism pod device 10. Range pole 72 may be used when the ground is uneven or the distances are great, such that prism pod device 10 would be obscured. Range pole 72 may also be used with prism pod device 10 as a conventional prism, that is by screwing prism pod device 10 into the top of range pole 72 and shooting at one of prisms 14 in prism pod device 10 on range pole 72, as is commonly known and done by those skilled in the art. Range pole 72 may also be used as a handle to lift up and magnetically attach prism pod device 10 to overhead pipes that are too high for a user to reach directly.

FIG. 7 also illustrates an optional peep sight 74 that may be used with the presently contemplated embodiment. Peep sight 74 threads into a hole around the outside diameter of prism 14 in top face 16 of housing 12, which hole is also keyed for proper alignment of peep sight 74. Peep sight 74 contains an arrow that is visible from the EDM equipment and indicates when prism pod device 10 is correctly aligned with the EDM equipment. Peep sight 74 is optional, however, because cross-hairs 56 generally provide sufficient alignment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Patent is:

1. A prism pod device for electronic distance measurement on pipe and level surfaces comprising:

(a) a housing having multiple faces;

(b) means in the housing for removably attaching the housing to a center-line of a pipe;

(c) means in the housing for exactly relocating the housing to the center line of the pipe once the housing has been removed from the pipe;

(d) means in the housing for exactly relocating the housing to a point on a surface once the housing has been removed from the point;

(e) a multiplicity of prisms, each of the prisms being on separate faces of the housing; and (f) means for directing the prisms to the center line of a pipe, whereby said distance measurements taken to each of the prisms are directed to the center line of the pipe.

* * * * *